United States Patent [19]

Alefeld

[11] Patent Number: 4,475,361

[45] Date of Patent: Oct. 9, 1984

[54] MULTI-EFFECT HEAT-PUMP FOR HEATING AND COOLING

[76] Inventor: Georg Alefeld, Josef-Raps-Strasse 3, Munich, Fed. Rep. of Germany

[21] Appl. No.: 490,659

[22] Filed: May 2, 1983

[51] Int. Cl.³ .............................................. F25B 15/00
[52] U.S. Cl. ..................................................... 62/476
[58] Field of Search ........................................... 62/476

[56] References Cited

U.S. PATENT DOCUMENTS

| | | | |
|---|---|---|---|
| 3,651,655 | 3/1972 | Dyre | 62/476 X |
| 3,817,050 | 6/1974 | Alexander et al. | 62/476 X |

*Primary Examiner*—Lloyd L. King
*Attorney, Agent, or Firm*—Frishauf, Holtz, Goodman & Woodward

[57] ABSTRACT

A multi-effect heat pump comprises at least three pairs of exchange units A, B; C, D; E, F, i.e. units which operate as generator, condenser, evaporator or absorber in at least two interconnected heat-pump circuits. Each pair operates in a different pressure range and the exchange units of each pressure range operate in different temperature ranges. An exchange unit (B) operating as condenser in an upper pressure range is adapted to deliver heat of condensation to a first exchange unit (C) operating as a second generator in a medium pressure range, and a second exchange unit (E) operating as absorber in a lower pressure range is adapted to deliver heat of absorption to a second exchange unit (D) operating in said medium pressure range. Means (84, 160, 166) are provided for selectively enabling and disabling alternatively the transfer of heat to said first exchange unit (C) or to said second exchange unit (D) to adapt the operation of the heat pump to varying conditions and demands.

6 Claims, 8 Drawing Figures

MULTI-EFFECT HEAT-PUMP FOR HEATING AND COOLING

The present invention relates to heat-pumps, more specifically to multi-effect heat-pump systems for heating and cooling purposes.

BACKGROUND

A double-effect heat-pump machine comprises two coupled heatpump circuits. Input heat is supplied to a first generator which works in a first, high pressure range and delivers working fluid vapor to a first condensator where the working fluid vapor is condensed and heat of condensation is generated. The heat of condensation is coupled to a second generator, which works in a second, intermediate pressure range and delivers working fluid vapor to a second condenser also working in said intermediate pressure range. The machine further comprises an evaporator and an absorber working in a third, low pressure range. The evaporator takes up heat of evaporation and, thus, effects cooling. Relatively low-grade heat is produced in the second condenser and in the absorber and must be disposed off as waste heat.

Double-effect machines are well known in the art and described e.g. in German Auslegeschrift DE-AS No. 1,501,141, U.S. Pat. No. 3,837,174, German Offenlegungsschrift DE-OS No. 29 44 960 and in my European patent application No. 82102473.4 (publication No. 0061721A1) corresponding to my U.S. patent application Ser. No. 417,118 filed under PCT No. 09/02/82 and incorporated by reference.

In the following, the term "exchange unit" is defined as in my above-identified earlier application and denotes the main components of a heat-pump cycle, in which the thermodynamic state of a working fluid may be changed, as by supply or removal of heat and/or by absorption in or desorption from an absorbent, as well known in the art. Thus, the term "exchange unit" includes generator, condenser, evaporator or desorber, absorber or resorber units which comprise main components of absorption cycle machines as well known in the art.

Generally, the heat-pump or thermodynamic cycles of the machines described in the above references are both heat coupled and fluid coupled, i.e. the working fluid circuits of the various stages communicate with each other.

U.S. Pat. No. 3,483,710 discloses a refrigerator system of the absorption type comprising two cascaded thermodynamic cycles which are thermally coupled but have individual, not-communicating working fluid circuits. Permanent heat transfer means are provided to transfer heat of condensation from an absorber in a first, higher loop to a generator in a second, lower loop, and heat of absorption from an absorber in the second, lower loop to an evaporator in the first, higher loop.

FIG. 9 of my earlier application discloses a heat-pump comprising three pairs of exchange units operating in upper, medium and lower pressure ranges, respectively. Heat transfer is provided for between a generator, operating in the upper pressure range, to a first exchange unit operating in the medium pressure range and in a relatively high temperature range, or alternatively between an absorber operating in said lower pressure range, and a second exchange unit operating in said medium pressure range and a relatively low temperature range compared with said relatively high temperature range. Thus, said first and second exchange units can alternatively operate as second generator and condenser respectively or as second absorber and evaporator, respectively.

FIG. 43a of my above-identified earlier application Ser. No. 417,118 shows schematically a three-stage heat-pump system which comprises four pairs of exchange units. Each pair operates in a different pressure range, thus, this proposed machine employs four pressure ranges. A first condenser operates in a first, upper pressure range and receives WF vapor from a first generator operating in the same pressure range. Heat of condensation produced in the first condenser is transferred to a second generator operating in a second, next lower pressure range to energize this second generator. Further, heat generated in an absorber operating in fourth, most lowest pressure range is transferred to an evaporator operating in a third second lowest pressure range.

THE INVENTION

It is an object to improve known double-effect machines which are well suited for cooling purposes so that they can be used effectively and efficiently for heating purposes as well. The heat delivered by the heat-pump cycle of the known machines is low-grade waste heat which, because of the low temperature of the absorber, is not well suited for heating purposes. This also generally prevented removing of the waste heat by air cooling.

Briefly, the heat-pump according to an embodiment of the invention which is preferred if efficiency is more important than investment costs, comprises a first generator and a first condenser operating in a first, high pressure range; a second generator and a second condenser operating in a second pressure range which is lower than said first pressure range; a first evaporator or desorber and a first absorber operating in a third pressure range which is lower than said second pressure range; and a second evaporator and a second absorber operating in fourth pressure range which is between said second and third pressure ranges. These exchange units are connected in three heat-pump loops, and heat-exchange is provided between the first condenser and the second evaporator, and between the first absorber and the second evaporator as schematically shown in FIG. 43 of my above-identified earlier application. According to the invention, means are provided to control the amount of heat transferred from said frist condenser to said second generator and/or the heat transferred from said first absorber to said second evaporator. By this means, the operation of the inventive heat-pump can be accomodated to various demands and conditions of the environment. More specifically, the present heat-pump can be used both for cooling and for producing useful, relatively high-grade heat, e.g. for producing hot water for domestic use and/or heating, with a c.o.p. larger than one. This is not possible with the known double-effect machines which use the absorbent/working fluid system lithium bromide solution/$H_2O$ (which is also the preferred absorbent/WF system used in the present multi-effected heat-pump), because of the narrow solution field of $LiBr/H_2O$. Further, the heat-pump in accordance with the invention can transform low-grade heat, e.g. from the environment, into useful high-grade heat of useful temperature. Thus, the present heat-pump can be used in winter as a heat-pump heating device. No heat-pump or heat "multiplication" effect could be obtained with the known double-effect machines.

Preferred embodiments of the invention allow to vary the type of operation continuously and, thus, an optimal adaption to varying demands and operating conditions.

THE DRAWINGS

FIG. 1a is a schematic diagram of a prior art double-effect refrigerating machine fully disclosed in German Auslegeschrift DE-AS No. 21 36 408, to which U.S. Pat. No. 3,651,655, Dyre, corresponds, incorporated by reference;

FIG. 1b is a simplified diagram of the basic components and connections of the machine shown in FIG. 1a;

FIG. 2b is a diagram, similar to that in FIG. 1b, of the machine shown in FIG. 2a;

Figure 1A:
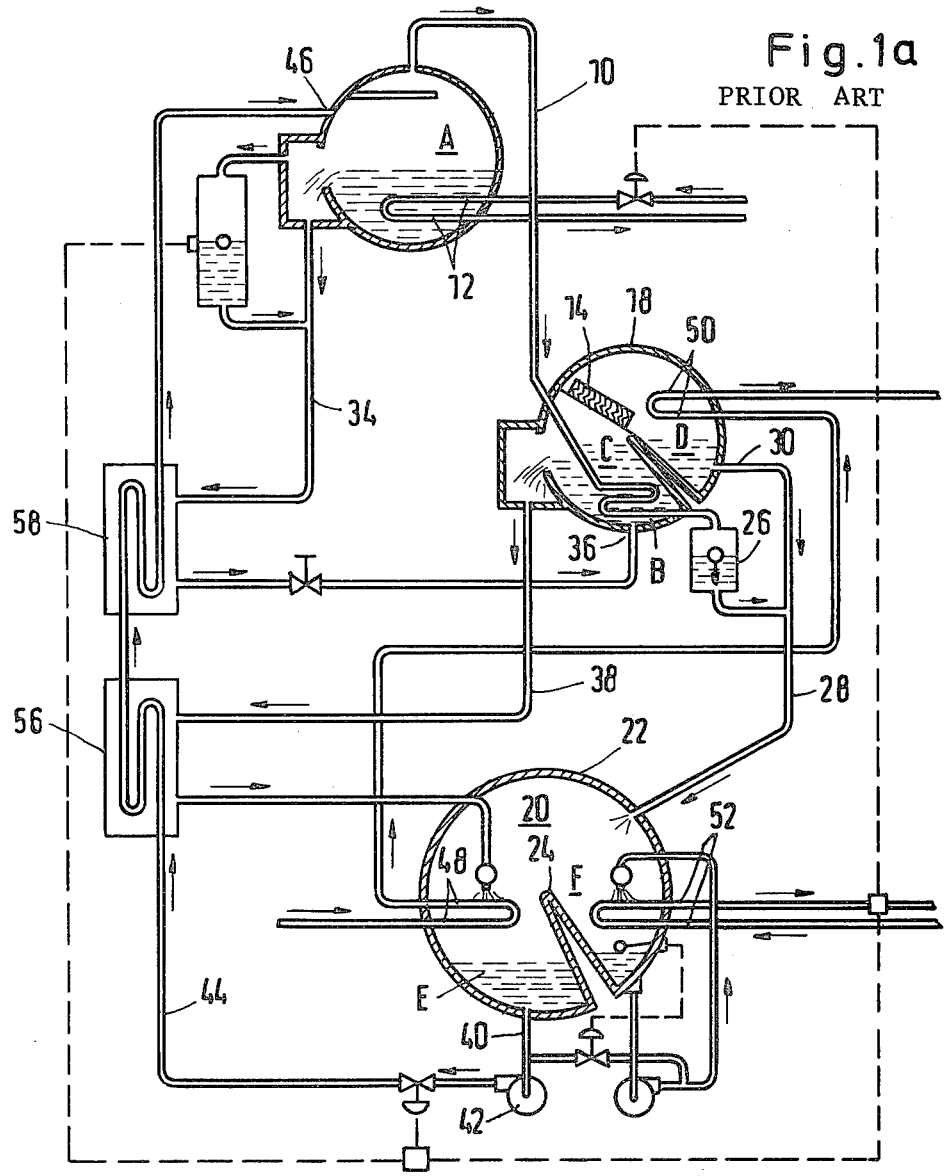
Figure 1B:
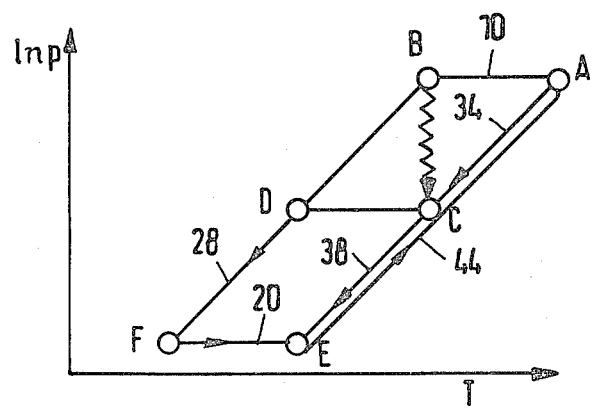

The prior art double-effect refrigerating machine shown in FIGS. 1a and 1b comprises six exchange units A, B, C, D, E and F. Exchange unit A is a first generator containing an absorbent and a working fluid (WF) absorbed therein. The absorbent and the working fluid may comprise an aqueous lithium bromide solution and $H_2O$, respectively. This system, which is also preferred for the heat-pump in accordance with the invention, will be shortly termed $LiBr/H_2O$.

B is a first condenser which is connected to a WF outlet of first generator A by a first WF conduit 10. The exchange units A and B operate in a first, high pressure range. Generator A is provided with heating means 12, e.g. a heat-exchanger element energized by steam.

C is a second generator. D is a second condenser connected to said second generator C by a second working fluid conduit 14 which in the embodiment shown is a baffle positioned between two portions of a drum-shaped container 18 housing the second generator C, the second condenser D and a heat-exchange coil forming the first condenser C. The second generator C and the second condenser D operate in a common, second pressure range which is below said first pressure range.

E is an absorber and F is an evaporator (or desorber) which operate in a common, third pressure range which is lower than the second pressure range. The evaporator F and the absorber E are connected by a third working fluid conduit 20, in fact they are comprised by a common container 22 comprising a wall 24 projecting into the interieur of container 22 and dividing its inner space into two communicating compartments which form the evaporator F and the absorber E.

First condenser B has its WF outlet connected to a storage vessel 26. Storage vessel 26 stores liquid WF and has an outlet connected by a fourth WF conduit 28 to a liquid WF inlet of evaporator F. Second condenser D has an outlet 30 which supplies liquid WF to the first WF conduit 28.

The first generator A is connected to an absorbent outlet conduit 34 through which absorbent comprising a medium proportion of WF flows to an absorbent inlet port 36 of the second generator C. The second generator C is connected to an absorbent outlet conduit 38 through which absorbent comprising a relatively small proportion of WF flows into absorber E. Absorber E has an absorbent outlet port 40 connected to the inlet of a pump 42, the outlet of which is connected to an absorbent conduit 44 through which absorbent comprising a relatively high proportion of WF is pumped to an absorbent inlet port 46 of the first generator A.

Absorber E is provided with a heat-exchange element 48, e.g. a tube coil, for removing heat of absorption generated by the absorption of WF in the absorbent.

Second condenser D comprises a heat-exchange element 50 to remove heat of condensation generated by the condensation of the WF supplied from the second generator C. Evaporator F is provided with a heat-exchange element 52 for supplying heat for evaporating the liquid working fluid supplied through conduit 28. Heat-exchange element 52 may be connected to an environment from which heat is to be removed, i.e. a heat-exchange element (not shown) of an air conditioning system as well known in the art.

The machine of FIG. 1 further comprises various valves, heat-exchangers 56, 58 and control means which do not form a part of the invention and are therefore not described in detail. The arrangement and function of these additional elements is fully disclosed in the above-mentioned U.S. Pat. No. 3,659,655 (German Auslegeschrift No. 21 36 408), incorporated by reference. The heat generated by the known machine in the absorber E has a relatively low temperature (30° to 40° C.) and is therefore generally not useable and must be removed by a wet cooling tower. This drawback is avoided by the invention of which a first embodiment is shown in figure 2. The heat-pump system shown in FIG. 2 differs from that shown in FIG. 1 mainly heat-exchange or auxiliary condenser means 84, and by two additional exchange units G and H, and an additional, controllable heat-exchange circuit 60 coupled between absorber E and exchange unit H which operates essentially as evaporator. G is a second absorber. The second absorber G and the second evaporator H operate in a pressure range intermediate between that of C, D and E, F. The second absorber G and the second evaporator H may be comprised by a common container or device 62 similar to container 22, thus, the improvement by the additional exchange units G, H can be implemented with very moderate expense on apparatus, and existing double-effect machines can be easily converted into machines embodying invention.

The second evaporator H has a WF inlet connected to WF conduit 28' coupled with its input end to the outlets of first condenser B, and second condenser D. The second evaporator H has an outlet port for liquid WF, which is connected by a working fluid conduit 28" to the working fluid inlet of the first evaporator F. The heat-exchange circuit 60 is somewhat similar to a circulation evaporator and comprises a WF outlet conduit 64 having its input end connected to a WF liquid outlet port of second evaporator H and its outlet end to a circulation pump 66. The outlet of pump 66 feeds a heat-exchange element 68 as a tube coil or plate heat exchange element arranged in heat-exchange relationship with the first absorber E. The output side of the heat-exchange element 68 is coupled via a return conduit 70 to a spray head 72 in the second evaporator H.

The absorbent outlet of the second generator C is connected to an absorbent conduit 38' connecting to a spray head in the second absorber G. The second absorber G has an absorbent outlet connected by an absorbent conduit 38" to a spray head in the first absorber E. The conduits 38', and 38" may go through heat-exchangers 74 and 76, respectively which perform the function of the single heat-exchanger 56 of FIG. 1 and provide for heat-exchange with the absorbent pumped through conduit 44 back to the first generator A.

Conduits 28' and 28" may be connected by a conduit 28''' which comprises a valve 78. Conduits 38' and 38" may be connected by a conduit 38''' comprising a valve 80.

The conduits, through which fluid is transferred from a higher to a lower pressure level comprise capillary tubes or flow restricting devices to provide for the necessary pressure drop as well known in the art.

The WF vapor outlet 82 of the first generator A may be coupled through a heat-exchanger 84 operating as auxiliary condenser, an WF liquid outlet conduit 86 of the heat-exchanger 84, and a valve 88 to conduit 10. Outlet conduit 86 is connected by a tube 90 to a WF liquid inlet port of the first generator A. The heat-exchanger 84 comprises an output heat-exchanging element 92 connected through valved fluid lines through which a heat transfer medium is circulated, to a heat utilizing device, as a central heating system, not shown.

The system described with reference to FIG. 2a has the benefit, that it can be operated in various ways to accomodate varying heat or cold demands and environmental temperature conditions:

In a first mode of operation heat-exchange circuit 60 is disabled by deenergizing pump 66. Further, valves 78 and 80 may be open. Under these conditions, the system of FIG. 2a operates as double-effect cooling machine quite similar to that shown in and described with reference of FIG. 1. Cooling is effected by a heat transfer circuit comprising heat-exchange element 52 of evaporator F. Relatively low-grade heat is produced in absorber E and condenser D, and removed by heat-exchange elements 48, 50, which may be serially connected in a heat transfer circuit which includes e.g. a cooling tower or other heat disposal device. This first mode of operation may be useful in summer.

In a second mode of operation, pump 66 is energized to put the heat-exchange circuit 60 in operation; valves 78 and 80 are closed, and heat-exchange element 48 is disconnected, e.g. by a three-way valve 94. In winter, this mode of operation can be advantageously used for heating utilizing the heat-pump effect: The system receives heat from ventilating exhausts or from the environment via heat-exchanger element 52 which, in this case, is connected e.g. to an appropriate cooling tower or other heat gathering device. Upgraded heat in a useful temperature range is derived from second condenser D through heat-exchange element 50 and from second absorber G via heat-exchange element 158.

The second mode of operation is also useful in summer: In this case, heat-exchange element 52 is used for cooling purposes, i.e. for removing heat in the context of an air-conditioning system, while useful heat, e.g. for producing hot water, is derived from heat-exchange elements 50 and 158. Alternatively, if heat-exchange elements 50 and 158 are coupled to a heat disposal system, e.g. an air-cooling tower, the system can be effectively used for cooling or air-conditioning purposes also when the temperature of the environment is high and the waste heat must be disposed with a relatively high temperature, e.g. if air-cooling is to be effected.

In a third mode of operation, the heat transfer from first condenser B to second generator C is at least in part disabled by putting the heat transfer circuit comprising heat-exchange element 92 of auxiliary condenser 94 in operation. Thus, heat of relatively high temperature is obtained from heat-exchange element 92 so that a demand for heat of relatively high temperature can be met if need may be, e.g. when the outdoor temperature is relatively low. Further, this mode of operation is useful to provide hot water in low cooling demand periods in summer. The heat-exchange circuit 60 may be activated or not as described with reference to modes 2, and 1, respectively.

A fourth mode of operation is obtained when valve 88 is closed. In this case, all of the heat supplied to the system is removed through auxiliary condenser 84 and heat-exchange element 92; the portions comprising units B to F are out of operation. This type of operation is known and may be used when the temperature of the heat source connected to heat-exchange element 52 becomes to low for proper operation of evaporator F.

Evaporator F would normally comprise only working fluid, however, it may comprise also some LiBr to avoid freezing when the machine is operating in modes 2 or 3.

Figure 2A:
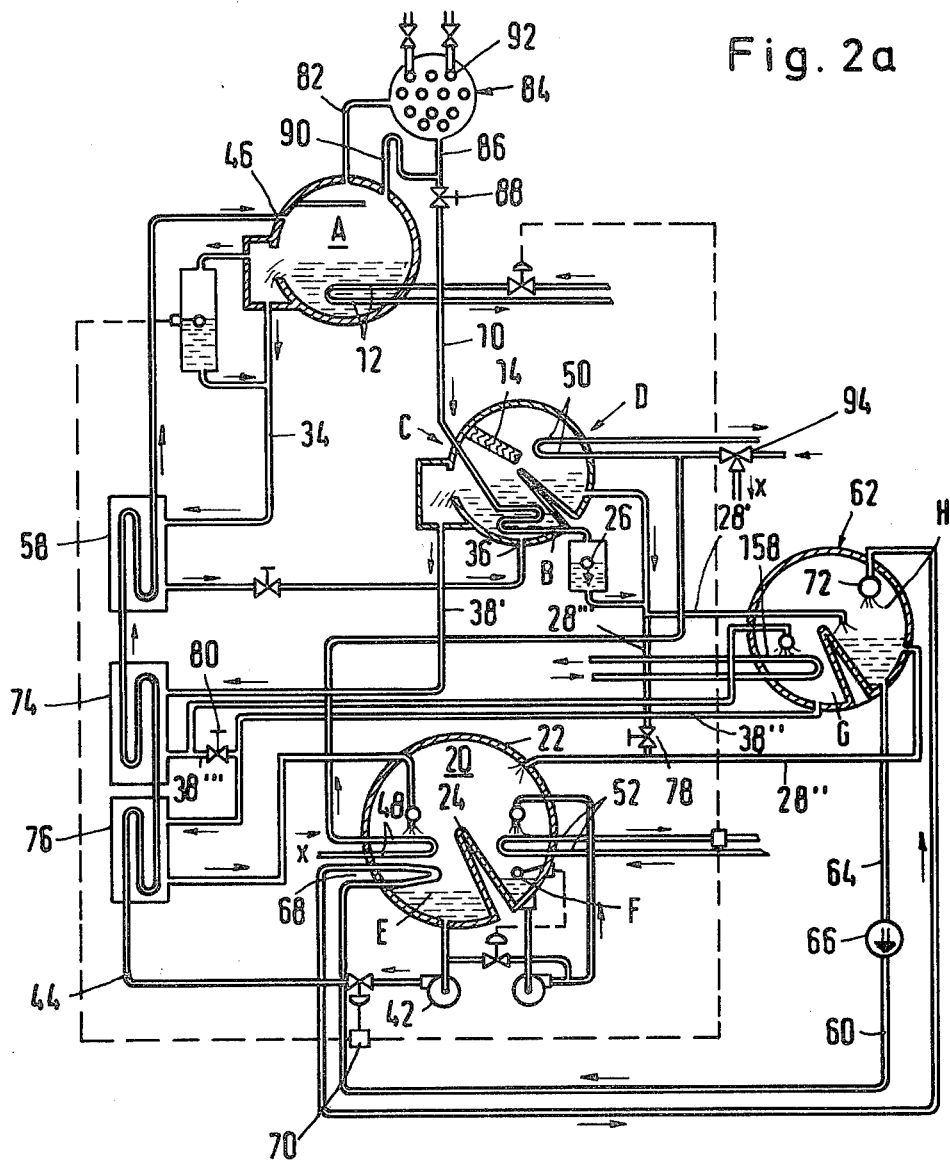
FIG. 2a is a schematic diagram of a first embodiment of the present invention; which is preferred if efficiency is more important than investment costs.

It should be obvious for those skilled in the art, that the operation of the heat-pump system of FIG. 2a can be varied continuously between the above described four modes of operations. Thus, valves 78 and 80 are closed and the throughput of the pump 66 is varied between zero and some maximum value to vary the operation from mode 1 to mode 2, i.e. from a double-effect mode of heat-pump operation to a single-effect heat-pump operation. Then, increasing amounts of heat are withdrawn via auxiliary condenser 84, and eventually the valve 88 is closed and pump 66 is shut down to vary the operation from mode 2 to mode 4. The connections of the heat-exchanger elements 48, 50, 52, 158 are varied as explained above.

The pump 66 may be omitted if the circulation of the working fluid in the heat-exchange circuit 60 is effected by the known bubble pump effect.

The embodiment shown in FIG. 3 also allows variation of the mode of operation, similar to that of the embodiment described with reference to FIG. 2a, however, this is effected with less additional devices at the expense of a somewhat reduced efficiency, compared with the embodiment of FIG. 2a. Thus, the embodiment of FIG. 3 is preferred if the investment costs are more important than the efficiency of operation in the heating mode.

Figure 3:
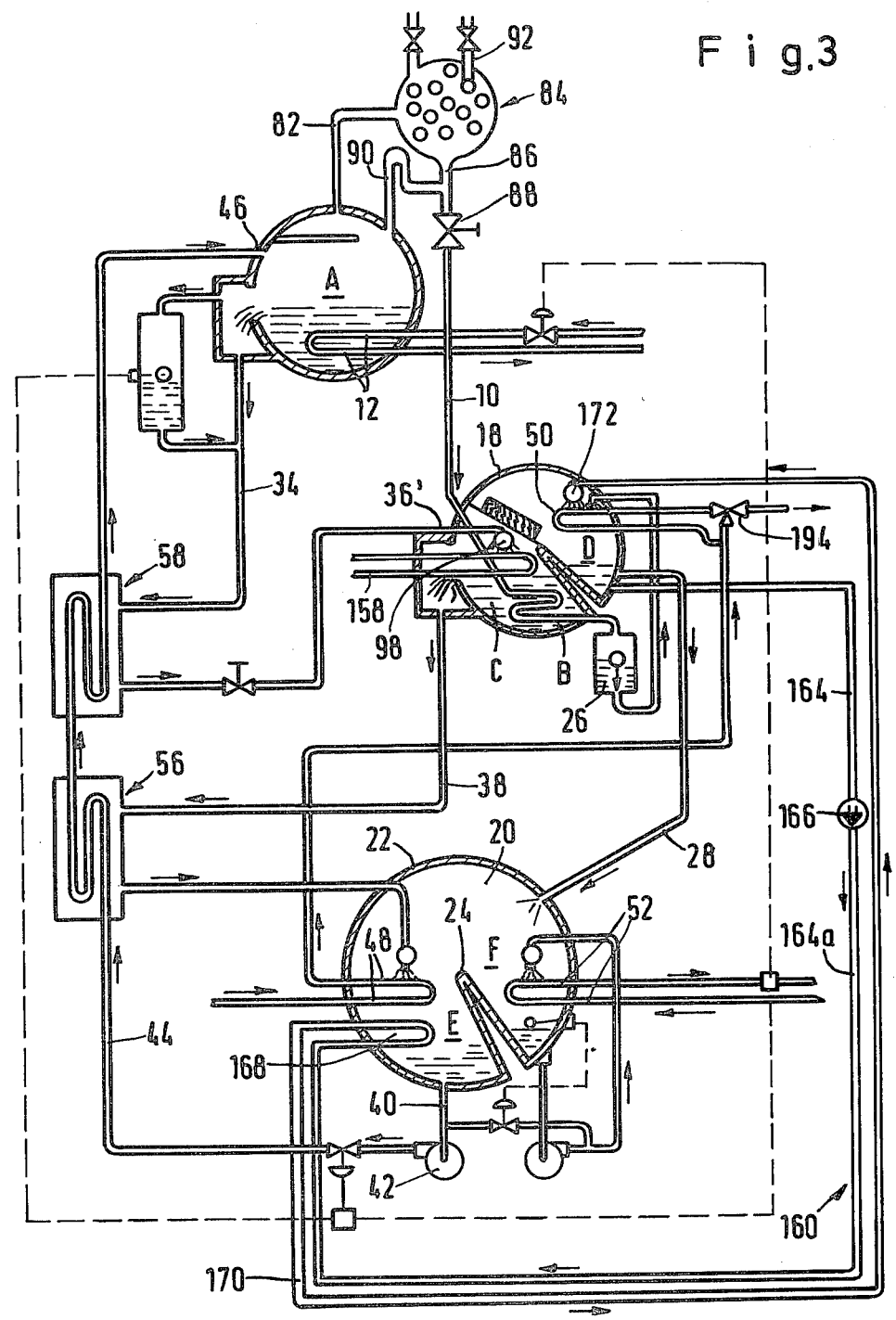
FIGS. 3, 4a, 4b and 4c are diagrams, similar to those shown in FIGS. 1a and 2a of second and third embodiments of the invention, respectively.

The heat-pump shown in FIG. 3 has the same basic concept as the known heat-pump shown in FIG. 1: It also comprises 6 exchange units A, B, C, D, E, and F. As in FIG. 1a, A operates as first generator, B as first condenser, E as absorber, and F as evaporator. The heat-pump of FIG. 3 differs from that shown in FIG. 1a in that the functions of C, and D can be selectively be changed. Thus, in a first mode of operation, C operates as second generator, and D as second condenser as in the heat-pump system shown in FIG. 1a. In a second mode of operation, C operates as absorber and D operates as evaporator, and heat is transferred from E to D. To allow these alternative modes of operation, only relatively small alterations are necessary to the known heat-pump of FIG. 1a: First, a heat-exchange circuit 160 is coupled between E and D. This heat-exchange circuit comprises a circulation pump 166, a conduit 164 connected between an outlet D and an inlet of pump 166; a heat-exchange element 168 positioned for remove heat from absorber E, a conduit 164a connected between an outlet of pump 166 and an inlet of heat-exchange element 168; a spray head 172 mounted in exchange unit D above heat-exchange element 50, and a conduit 170 connected between exit of heat-exchange element 168 and the spray head 172. The exit of condenser B is coupled to a liquid WF input of D, e.g. through the storage vessel 26.

Conduit 34 conducting absorbent solution from first generator A to unit C has its exit end 36' connected to a spray head 98. Unit C is provided with an additional heat-exchange element 158. The system of FIG. 3 further includes an auxiliary condenser system comprising elements 84, 86, 88, 90, 92 described with reference to FIG. 2a.

In the first mode of operation, heat-exchange circuit 160 is disabled by de-energizing pump 166, and the system operates as a double-effect machine like the known machine described with reference to FIGS. 1a, and 1b. In this mode of operation, heat is transferred from condenser B to unit C which operates as second generator. Waste heat is removed by 48 and 50.

In the second, alternative mode of operation, unit C is operated as a second absorber, unit D is operated as a second evaporator, and heat is transferred from first absorber E to second evaporator D. Cooling can be effected by means of heat-exchanger element 52 and useful heat at relatively high temperatures can be derived from heat-exchange elements 92, and 158. To obtain this second mode of operation, the following operations are performed:

The auxiliary condenser 84 is put in operation with valve 8 remaining open, so that no heat of condensation is produced in unit B and the transfer of condensation heat to unit C is effectively prevented.

Heat-exchange element 158 is activated to remove heat from C via an appropriate heat transfer circuit (not shown).

Pump 166 is energized.

Heat-exchange elements 48, and 50 are disabled.

In this mode of operation, WF (water) vapor produced in D by evaporation of liquid WF heated in 168, is absorbed in the absorbent fed to C through the spray head 98. The heat of absorption produced in a relatively high temperature range (e.g. 50° to 70° C.) is utilized by means of heat-exchanger element 158. Further heat at even higher temperature is derived through heat-exchange element 92.

A third mode operation for heating purposes is obtained by closing valve 88 and shutting down all components with exception of A and 84.

A continuous transition from mode 1 to mode 2 is effected as follows: Heat in increasing amounts is withdrawn by means of 84, while valve 88 is open, until all vapor generated in A condenses in auxiliary condenser 84. Now, pump 166 is energized, and its throughput is increased from zero to a maximum value, thus, increasing proportions of the absorption heat produced in unit E is transferred to unit D. 50 is disconnected by valve means 194. The balance of the absorption heat is transferred via 48 to a heat disposal device not shown. Eventually, 48 is disabled, when the system is operating in mode 2.

In a modification of the heat-pump of FIG. 3, no additional heat-exchange or heat transfer circuit 160 is used, and means are provided to use heat-exchange elements 48, and 50 for this purpose. Thus, the exit end of heat-exchange element 50 may be connected by a pump to the entrance side of heat-exchange element 48, and a suitable heat transfer medium, as water is circulated for transferring heat from E to D, as described with reference to FIG. 4a.

Figure 4A:
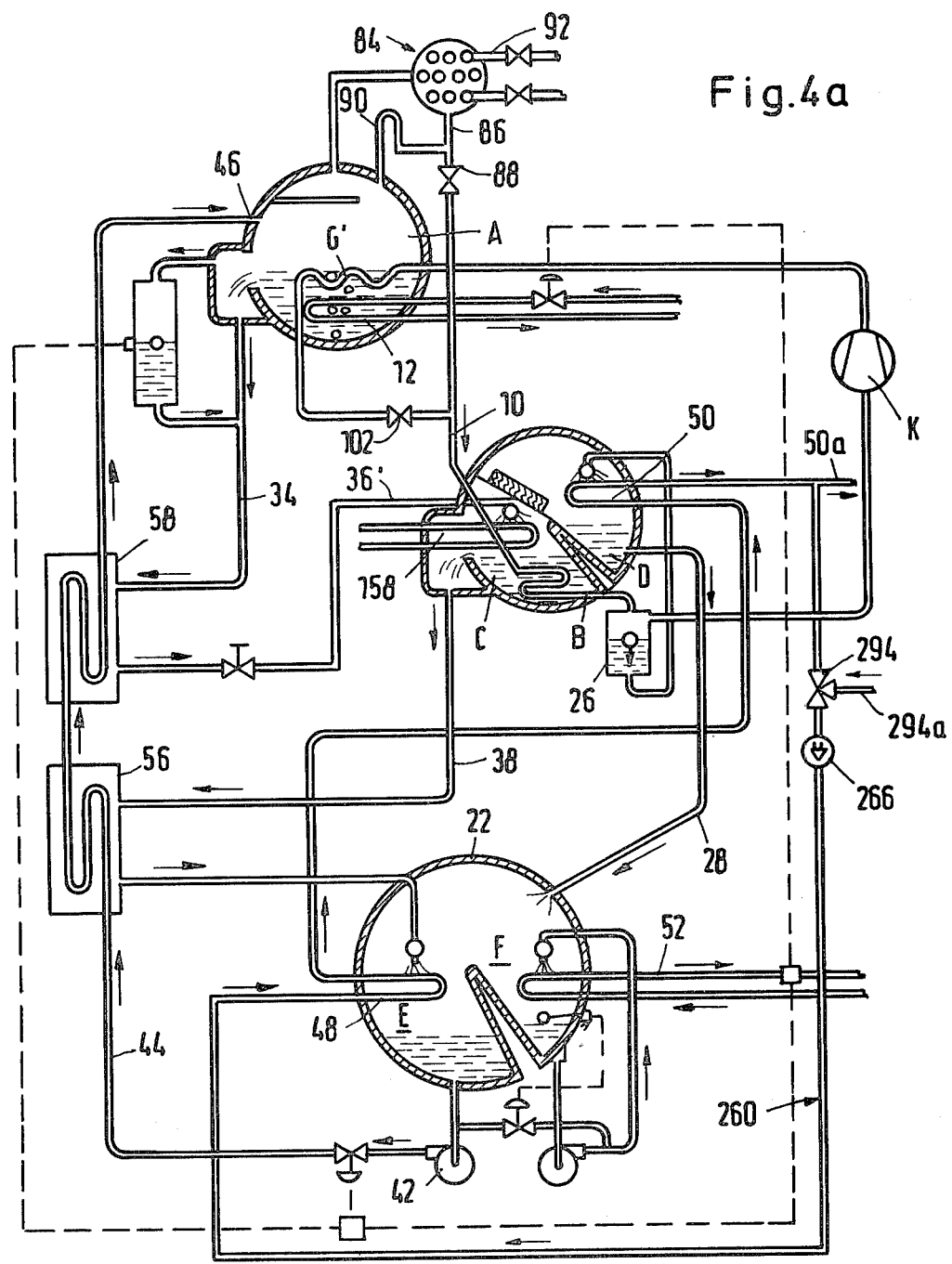
Figure 4B:
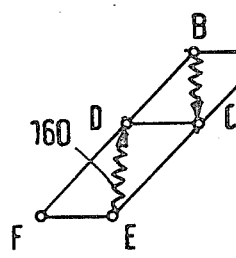
Figure 4C:
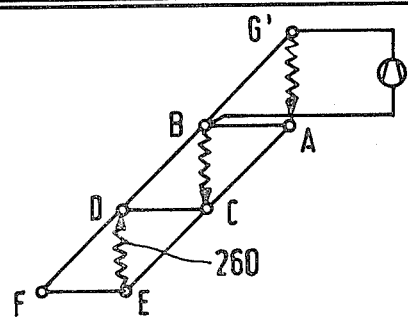

The heat-pump shown in FIG. 3 can also or further be modified as shown in FIG. 4 by employing to pump WF vapor from C via D to B via A, an additional compressor K2 in combination with an additional condenser G' as shown in FIG. 4c.

FIG. 4b is a schematic diagram of the basic machine, i.e. the machine described with reference to FIG. 3. In FIG. 4a, heat-exchange elements 48, and 50, a pump 266, and a three-way-valve 294 are used to implement a heat transfer or heat-exchange circuit 260 for transferring heat from absorber E to evaporator D. This heat-exchange circuit can be disabled by connecting the entrance side of pump 266 through three-way-valve 294 to a cooling tower or other heat disposal system. In this case, the heat-exchange elements 48, 50 serve to remove heat from the system as in FIG. 1a.

The modification shown in FIG. 4c comprises in fact an additional compressor heat-pump stage and an additional pressure range. Compressor K2 has its input side effectively connected to generator A via condenser B, more specifically to the vapor space in storage vessel 26, and feeds pressurized WF vapor to the additional condenser G' which is a heat-exchange element mounted in the first generator A. The additional condenser G' delivers additional heat to first generator A. The exit side of the additional condenser G' is connected to conduit 10 through a pressure reducing device 102.

The system of FIG. 4a can be operated as a boosted double-effect machine in this case, a heat disposal device, as a cooling tower, is connected through conduit 294a and three-way-valve 294 to the entrance side of pump 266. The heat transfer medium circulated through heat-exchange elements 48 and 50 is returned to the cooling tower through conduit 50a. In this case heat-exchange between B and C is operative while heat-exchange between E and D is disabled.

In a second mode of operation, the cooling tower is shut off and the exit of heat-exchange element 50 is connected through three-way-valve 294 to the entrance of pump 266. The first condenser B is disabled by putting auxiliary condenser 84 into operation as described above with reference to FIG. 2a.

If a continuous transition between modes 1 and 2 is desired, a separate heat transfer circuit may be provided between E and D as shown in FIG. 3a.

Figure 2B:
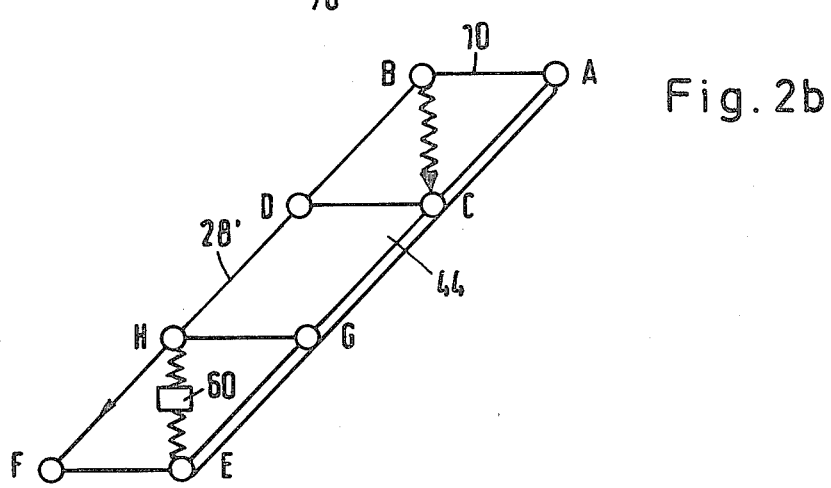

It should be obvious, that the machine shown in FIG. 2a and 2b can also be modified by connecting an additional compressor and an additional condenser (corresponding to K2 and G' respectively) to B, said additional condenser being arranged to deliver heat of condensation to the absorbent WF mixture in first generator A, as explained with reference to figure 4a and 4c. In this case heat-exchange may be effected between B and C, and between H and E, and between G' and A simultaneously.

Typical sets of approximate values of parameters for the embodiments described, in the inventive mode of operation, are:

| Embodiment of FIG. 2a (heat transfer between H and E in operation) Absorbent/WF system: LiBr/H$_2$O; | | | | |
|---|---|---|---|---|
| Approximate Pressures (millibar) | | | | |
| A and B: | | 1000 | | (800) |
| C and D: | | 140 | | (100) |
| G and H: | | 30 | | (25) |
| E and F: | | 6 | | (6) |
| Approximate operating temperature ranges in degrees centigrade: | | | | |
| A: | 140–150 | (135–140) | B: 100 | (93) |
| C: | 92–95 | (83–88) | D: 53 | (46) |
| G: | 58–63 | (55–59) | H: 24 | (21) |
| E: | 28–32 | (27–30) | F: ca. 0 | (ca. 0) |

| Embodiment of FIG. 3 (heat transfer between E and D in operation) | | | | |
|---|---|---|---|---|
| Unit | Pressure | (mbar) | Temperature Range (°C.) | |
| A | 800 | (800) | 140–150 | (140–150) |
| B | 800 | (800) | 93 | (93) |
| C | 43 | (33) | 60–70 | (55–65) |
| D | 43 | (33) | 30 | (25) |
| E | 9 | (6) | 35–45 | (30–40) |
| F | 9 | (6) | 7 | (ca. 0) |

The embodiments disclosed are examples only and can be modified in various ways, as will be obvious to those skilled in the art. Other absorbent/WF systems may be used with other pressure and temperature ranges. Examples of other systems are LiBr/H$_2$O with various known additives as e.g. glycol ("Carrol" (TM)), hydrocarbones, corrosion inhibitors; or LiBr/ZnBr$_2$/C-H$_3$OH, withour or with additives.

It should further be pointed out, that the double-effect machine shown in FIG. 1 and used as base for explaining the invention, is only a non-limiting example of the various double-effect machines to which the invention is applicable. Other examples of double-effect machines which can be modified and improved in accordance with the invention by a controllable heat transfer circuit and which have e.g. absorbent and WF conduit configurations differing from FIG. 1, are those described e.g. in German Offenlegungsschrift No. 2,944,960 and U.S. Pat. No. 3,837,174, and machines having a common envelope containing all of the exchange units of the machine.

I claim:

1. A heat-pump comprising
   a first working fluid (WF) loop including
      first means (A) operating in a first, relatively high pressure range and arranged to receive heat for producing WF vapor of relatively high pressure, and absorbent partially depleted of WF, by heating absorbent relatively rich in WF;
      second means (B) coupled to receive said relatively high pressure WF vapor to produce liquid WF and heat of condensation;
      third means (F) coupled to receive heat and liquid WF and a relatively low pressure to produce relatively low pressure WF vapor, and
      fourth means (E) coupled to receive said relatively low pressure WF vapor and relatively low pressure depleted absorbent to produce absorbent relatively rich in WF, and heat of absorption, and
      fifth means (42, 44) to return absorbent relatively rich in WF at said first, relatively high pressure to said first means (A);
   a second WF loop in WF fluid connection with said first loop and including
      sixth means (C) operating in a second, relatively high pressure range which is lower than said first relatively high pressure range and connected by absorbent conduit means to said first and fourth means (A, E), said sixth means comprising heat-exchange means (158) adapted to be coupled to a heat transfer circuit
      seventh means (D) in WF vapor communication with said sixth means,
      first fluid connection means (28) for supplying liquid WF from said seventh means (D) to said third means (F), and
      second fluid connection means (38) for supplying absorbent from said sixth means (C) to said fourth means (E);
      first heat transfer means adapted to transfer heat from said second means (B) to said sixth means (C);
      second heat transfer means (160) adapted to transfer heat from said fourth means (E) to said sixth means (D), and
      eighth means (84, 166) adapted to selectively disabling at least partially at least one of said heat transfer means.

2. A heat-pump comprising
   first generator means (A) operating in a first, relatively high pressure range and arranged to receive heat for producing working fluid (WF) vapor of relatively high pressure and absorbent partially depleted of WF by heating an absorbent/WF system;
   first condenser means (B) coupled to receive said relatively high pressure working fluid vapor to produce liquid working fluid and heat of condensation;
   second generator means operating in a second pressure range below said first pressure range and coupled to receive absorbent and heat to produce WF vapor of a pressure in said second pressure range;
   second condenser means (D) coupled to receive said WF vapor from said second generator, to produce WF liquid and heat of condensation; said second condenser comprising means (50) for removing said heat of condensation;
   first evaporator means (F) connected to receive heat and WF liquid and heat to produce WF vapor of a pressure in a third pressure range below said second pressure range;
   first absorber means (E) coupled to receive WF vapor from said first evaporator (F) and depleted absorbent to produce absorbent rich in WF, and heat of absorption;
   second evaporator means (H) operating in a fourth pressure range between said second and third pressure ranges and connected to receive liquid WF from at least one of said condensers (B, D) and heat to produce WF vapor of a pressure in said fourth pressure range;
   second absorber means (G) connected to receive WF vapor from said second evaporator (H), and absorbent;
   means (158) for withdrawing heat from said second absorber means (G);

means (42, 44) for returning absorbent relatively rich in WF into said first and second generators (A, C);

first heat transfer means for transferring heat from said first condenser (B) to said second generator (C);

second heat transfer means (60) for transferring heat from said first absorber (E) to said second evaporator (H); and means (84, 66) for selectively disabling at least partially at least one of said heat transfer means.

3. A heat-pump as claimed in claim 1 additionally comprising a compression heat-pump circuit (K2, G') coupled to said means operating in said first, relatively high pressure range.

4. A heat-pump as claimed in claim 1 wherein said first means (A) comprises a generator; said second means (B) comprises a first condenser; said third means (F) comprises a first evaporator; said fourth means (E) comprises a first absorber; said sixth means (C) being adapted to operate alternatively as second generator or second absorber; and said seventh means (D) being adapted to operate alternatively as second condenser or second evaporator.

5. A heat-pump as claimed in claim 1 wherein said fourth (E) and said seventh (D) means comprise first and second heat-exchange means (48, 50) and said means (294) is provided to connect said first and second heat-exchange means alternatively into a heat transfer circuit for disposing heat generated in said fourth and seventh means, or into a closed heat transfer circuit (260) to provide said second heat transfer means.

6. A heat-pump as claimed in claim 2 additionally comprising a compression heat-pump circuit (K2, G') coupled to said means operating in said first, relatively high pressure range.

* * * * *